US009464616B2

(12) United States Patent
Hobart et al.

(10) Patent No.: US 9,464,616 B2
(45) Date of Patent: Oct. 11, 2016

(54) PORTABLE ENGINE PREHEATER FIRED BY PROPANE

(76) Inventors: Richard Lee Hobart, El Dorado, AR (US); John Bennett Hobart, Vienna (AT)

( * ) Notice: Subject to any disclaimer, the term of this patent is extended or adjusted under 35 U.S.C. 154(b) by 0 days.

(21) Appl. No.: 13/477,007

(22) Filed: May 21, 2012

(65) Prior Publication Data

US 2012/0291738 A1 Nov. 22, 2012

Related U.S. Application Data

(60) Provisional application No. 61/488,661, filed on May 20, 2011.

(51) Int. Cl.
*B60H 1/03* (2006.01)
*F02N 19/10* (2010.01)

(52) U.S. Cl.
CPC .................................... *F02N 19/10* (2013.01)

(58) Field of Classification Search
CPC ...... F02N 19/10; F02B 19/1009; F24H 1/00; F24H 1/009; F24H 1/06; F24H 1/145; F24H 1/186; F24H 2240/06; F24H 9/0084; F28F 9/0243; F28D 15/00; F28D 15/0275; F28D 7/02; F28D 7/024; F28D 7/028
USPC .................................................. 123/142.5 R
See application file for complete search history.

(56) References Cited

U.S. PATENT DOCUMENTS 1,980,424 A * 11/1934 Morgan .................... F24H 1/26 122/156
2,021,569 A * 11/1935 Pasco ..................... 123/142.5 R
2,623,511 A * 12/1952 Olof Welin-Berger .... 123/142.5 E
3,131,864 A * 5/1964 Marion .................. B60H 1/032 123/142.5 R
3,304,004 A * 2/1967 Mykola ................ B60H 1/2212 123/142.5 R
3,400,700 A * 9/1968 Lindsey et al. ........ 123/142.5 R
3,682,142 A * 8/1972 Newkirk ........................... 123/3
3,758,031 A * 9/1973 Moran ................. B60H 1/2209 123/142.5 R
3,765,389 A * 10/1973 Henchel ................. 123/142.5 R
4,192,274 A * 3/1980 Damon .................. 123/142.5 R
4,348,992 A * 9/1982 Southard ................ F02N 19/10 122/120
4,437,830 A * 3/1984 Harris et al. ..................... 431/54
4,537,349 A * 8/1985 Stolz ........................ 237/12.3 C
4,611,655 A * 9/1986 Molignoni .................... 165/163
4,706,644 A * 11/1987 Nakai ........................... 126/101
4,934,924 A * 6/1990 Nakai ............................. 431/41
4,978,291 A * 12/1990 Nakai ............................. 431/12
5,005,542 A * 4/1991 Rissanen ................ 123/142.5 R
5,048,753 A * 9/1991 Kellie .................... B60H 1/032 123/142.5 R
5,205,250 A * 4/1993 Easterly .................. F02N 19/10 123/142.5 R
5,499,615 A * 3/1996 Lawrence et al. ............ 123/526

(Continued)

*Primary Examiner* — John Kwon
*Assistant Examiner* — Tea Holbrook
(74) *Attorney, Agent, or Firm* — Lyman Smith; Patent Service Associates

(57) ABSTRACT

An engine preheating system supports starting industrial and/or diesel engines in cold weather, eliminating the need for cold weather idling. The system preheats the engine coolant, bringing the entire machine up to a warm starting condition. This provides good lubrication and immediate heat availability. The system is fully portable and does not rely on commercial power, operable at any location. The system utilizes propane fuel, which is widely available. The propane fuel burns quietly and cleanly as opposed to fuel oil. The system includes numerous safety features, such as flow indicators and modern microprocessor technology to ensure safe operation.

18 Claims, 2 Drawing Sheets

(56) References Cited

U.S. PATENT DOCUMENTS

| | | | | |
|---|---|---|---|---|
| 5,509,807 | A * | 4/1996 | Joice et al. | 434/226 |
| 5,584,269 | A * | 12/1996 | MacKenzie | 123/142.5 R |
| 5,738,070 | A * | 4/1998 | Donaldson | F02D 41/0027 123/352 |
| 5,821,396 | A * | 10/1998 | Bouziane | 585/241 |
| 6,044,837 | A * | 4/2000 | Tyler | 126/99 C |
| 7,503,184 | B2 * | 3/2009 | Copeland et al. | 62/238.7 |
| 2005/0258263 | A1 * | 11/2005 | Robinson | 237/12.1 |
| 2006/0000426 | A1 * | 1/2006 | Schlesser et al. | 122/446 |
| 2006/0042583 | A1 * | 3/2006 | Bourgault et al. | 123/142.5 R |
| 2006/0286493 | A1 * | 12/2006 | Abrahamsson | 431/3 |
| 2007/0062490 | A1 * | 3/2007 | Yang | 123/435 |
| 2007/0262180 | A1 * | 11/2007 | Adams | 239/738 |
| 2008/0034777 | A1 * | 2/2008 | Copeland et al. | 62/323.1 |
| 2008/0245503 | A1 * | 10/2008 | Wilson et al. | 165/42 |
| 2008/0271454 | A1 * | 11/2008 | Hansen | 60/670 |
| 2008/0276913 | A1 * | 11/2008 | Zubeck | 123/543 |
| 2009/0126691 | A1 * | 5/2009 | Bach | 123/480 |
| 2009/0173486 | A1 * | 7/2009 | Copeland et al. | 165/240 |
| 2011/0240141 | A1 * | 10/2011 | Kleinberger | 137/340 |
| 2012/0060522 | A1 * | 3/2012 | Markowitz et al. | 62/79 |

* cited by examiner

PORTABLE ENGINE PREHEATER FIRED BY PROPANE

CROSS-REFERENCE TO RELATED APPLICATIONS

This application claims the benefit of priority of U.S. provisional patent application No. 61/488,661, filed May 20, 2011, the contents of which are herein incorporated by reference.

BACKGROUND OF THE INVENTION

The present invention relates to engine preheaters and, more particularly, to a fully portable engine preheater fired by propane.

Industrial and/or diesel engines can be difficult to start in cold weather. Often, these engines are left at idle during cold conditions to keep the engine warm. An engine preheater may be used to keep the coolant of an engine warm.

Conventional engine preheaters are usually expensive, emit bad odors and make noise. They often have complex construction with multiple joints. Very few conventional engine preheaters are fully portable. The existing systems are diesel fueled and have high heat fluxes with the attendant risk.

As can be seen, there is a need for an improved engine preheater that may be inexpensive, clean, safe and fully portable.

SUMMARY OF THE INVENTION

In one aspect of the present invention, an engine preheater comprises a propane fuel burner adapted to receive propane fuel; an air blower delivering air to the propane fuel burner; and a horizontal heat exchanger adapted to transfer heat from hot gas from the propane fuel burner to coolant flowing to and from an engine.

In another aspect of the present invention, a method for maintaining or preheating engine coolant comprises flowing coolant from the engine through a horizontal heat exchanger; receiving hot gas into the heat exchanger from a propane fuel burner, the hot gas transferring heat to the coolant in the heat exchanger; returning heated coolant to the engine; and controlling the total process through a microprocessor, the microprocessor adapted to receive data from several sensors.

These and other features, aspects and advantages of the present invention will become better understood with reference to the following drawings, description and claims.

DETAILED DESCRIPTION OF THE INVENTION

Figure 1:
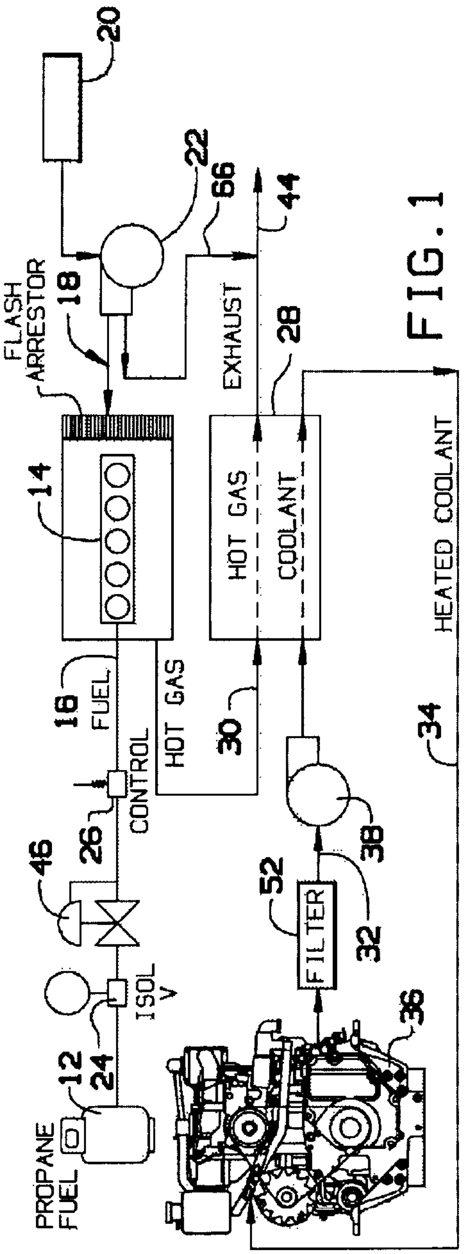
FIG. 1 is a schematic representation of an engine preheating system according to an exemplary embodiment of the present invention.
Figure 2:
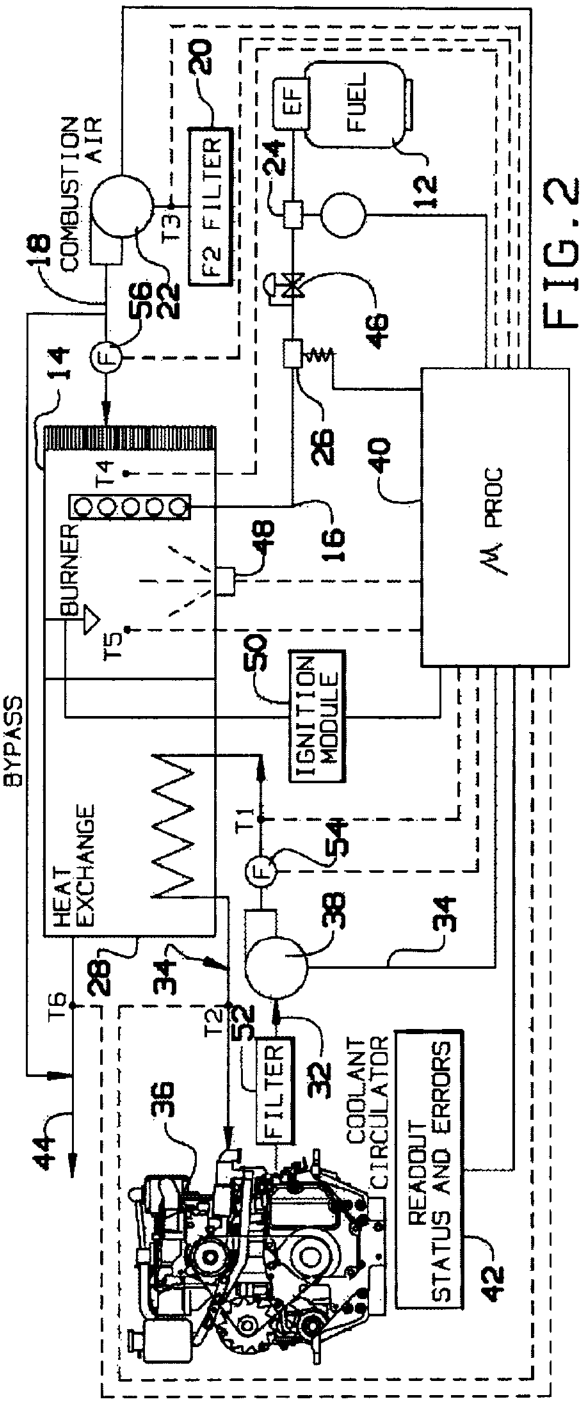
FIG. 2 is a instrument schematic representation of an engine preheating system according to an exemplary embodiment of the present invention.
Figures 3, 4:
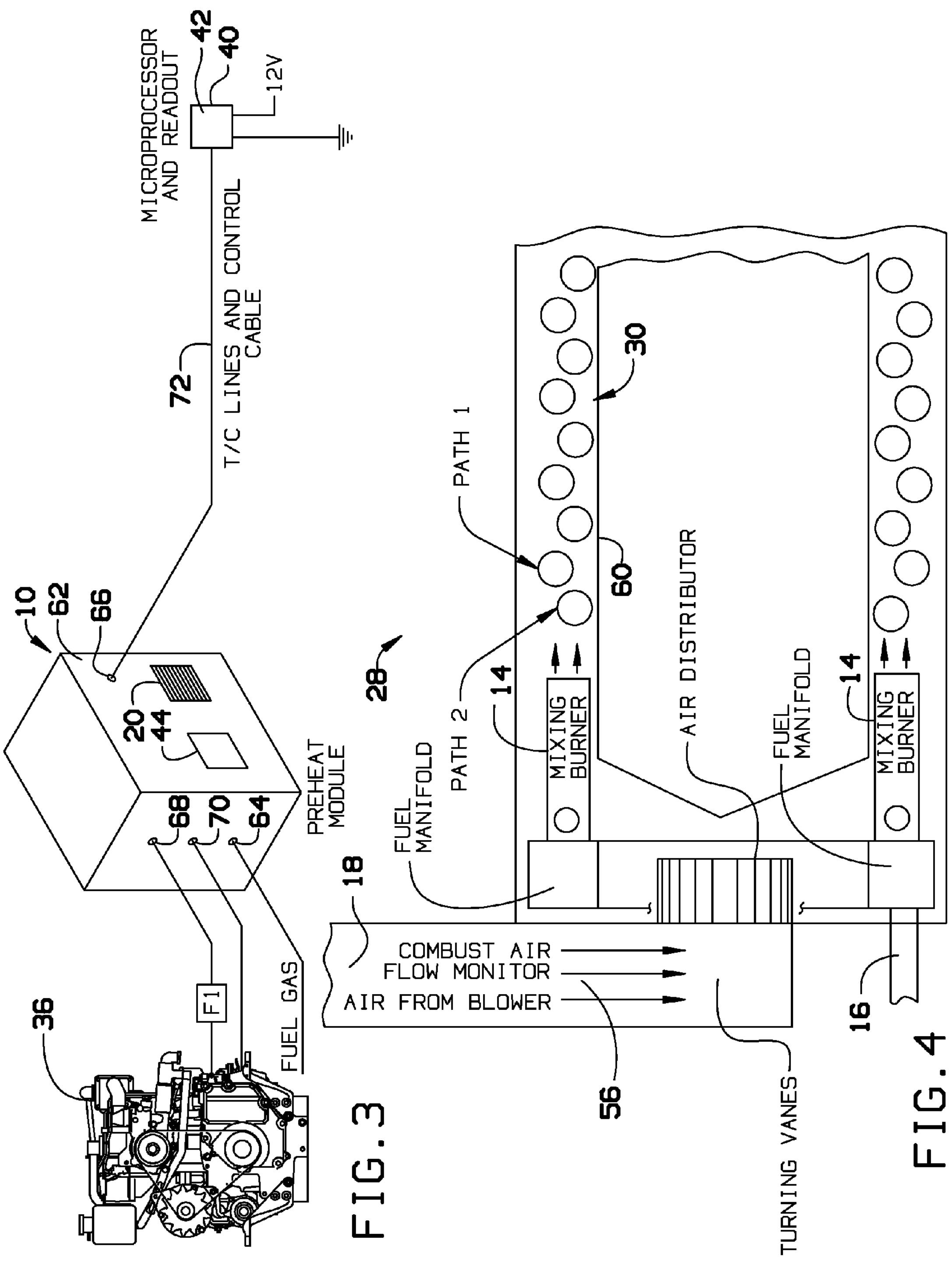
FIG. 3 is a cross-sectional view of a horizontal heat exchanger used in the engine preheating system of the present invention.
FIG. 4 is a perspective view of the preheat module according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an engine preheating system that supports starting industrial and/or diesel engines in cold weather, eliminating the need for cold weather idling. The system of the present invention preheats the engine coolant, bringing the entire machine up to a warm starting condition. This provides good lubrication and immediate heat availability. The system is fully portable and does not rely on commercial power, operable at any location. The system utilizes propane fuel, which is widely available. The propane fuel burns quietly and cleanly as opposed to fuel oil. The system includes numerous safety features, such as flow indicators and modern microprocessor technology to ensure safe operation. The system can be expanded to provide space heat for the cab as desired.

Referring now to the Figures, an engine preheater includes a propane source 12 to deliver fuel gas 16 to burner nozzles 14. The nozzles 14 premix fuel 16 with air 18 for optimum combustion. The air 18 may be passed through a filter 20 and accelerated with, for example, a fan 22, to then be delivered to the nozzles 14. The fuel gas 12 may pass through various valves, such as an isolation valve 24. The fuel gas 12 may also pass through a shutoff 26 to control fuel flow. A horizontal heat exchanger 28 can transfer heat from the combustion gases 30 to the coolant 32 to provide a heated coolant 34 back to an engine 36. A coolant circulation pump 38 may move the coolant 32 through the heat exchanger 28. Comprehensive instrumentation/control includes feedback data to a microprocessor 40, software in microprocessor memory, output functions controlling valves, pumps, blowers and the like. Comprehensive diagnostics include program steps built into the program that identify problems and communicate that to an operator interface 42. A failsafe shutdown can be included as a separate electrical system that monitors process temperature (such as air temperature T3, burner temperature T5, exhaust temperature T6, heated coolant temperature T2, unheated coolant temperature T1, and the like) and will shut down the system if the microprocessor fails.

The operator interface 42 can include a readout module having LED indicators and alpha numeric text readout of status/abnormal conditions. The coolant circulation pump 38 may be a high efficiency circulator for moving engine coolant through the heat exchanger 28 and back to the engine 36. The fan 22 may be a high efficiency blower that provides air for combustion 18 and bypass air 66 for cooling exhaust 44. The isolation valve 24 can be a failsafe fuel isolation cutoff valve for fuel to safely stop all fuel movement. The control regulator 46 may be a pressure control valve (PRV) to reduce the fuel pressure to a lower level and maintains it there. A solenoid control valve 26 can turn on fuel flow or stops it during operation. Thermocouples and thermisters T1, T2, T3, T4, T5 and T6 measure temperatures and report the data to the microprocessor 40. A flame detector 48 senses the light emission of the combustion and reports it to the microprocessor 40. An ignition module 50 can provide high voltage ignition for the fuel gas, according to microprocessor 40. A coolant strainer 52 can prevent coolant solids from fouling the heat exchanger internals.

Inlet air 18 is mixed with fuel 16 to provide hot gas 30 which passes through the heat exchanger 28, thus transferring heat to the coolant 32. A low circulation flow sensor 54 can notify the microprocessor 40 of insufficient coolant flow. A low air flow sensor 56 can notify the microprocessor 40 of inadequate inlet air flow. The cooled gas exits via the exhaust path 44. Coolant 32 is drawn into the circulation pump 38 and is delivered to the heat exchanger 28 in a counterflow. Upon heating, the heated coolant 34 returns to the engine block 36. The microprocessor 40 can evaluate all process conditions frequently and will issue warnings or shutdown outputs if off-standard conditions arise.

When the system is used, fluid circulation is established and monitored. If adequate, the burner is started and hot gas temperatures are monitored including inlet air flow and temperature. All of these parameters must meet specification limits to proceed. The starting heat rate may be limited to avoid thermal stress on the castings before full heat rate will be established. When the coolant reaches the final setting, the system shuts down and secures itself. The microprocessor checks all of the important system parameters and compares the inputs with stored data limits. The process continues if no limit is violated. If a limit is violated, the microprocessor will identify the parameter and may issue a warning or may shut down the heating. The parameter is identified for subsequent repair or correction (i.e., flow restriction), for example, filters are used and could become restrictive. The microprocessor can sense this and can react to notify the user. A backup control can shut down the system if the microprocessor fails. It is very important that comprehensive safety be imposed on the operation. The only way this can be done is with appropriate microprocessor control. Mechanical interlocks can fail and are inaccurate. The microcomputer will be in a safe location away from potential damage. The power supply will be adequately filtered to prevent electrical transients.

To make the system of the present invention, some fabrication equipment is required. For example, the heat exchanger can be made from stainless steel tubing (much safer than conventional designs). This requires a powered mandrell to wind the coils. The coils are mounted in a horizontal annular chamber 60 with a special burner assembly at one end. Combustion stoichiometry is controlled by orifices in the fuel gas and air paths. Fuel pressure is reduced by the pressure control valve 46. Fuel gas is switched on and off by solenoid 26. Coolant can be circulated counterflow to the hot burner gas for optimum heat exchange. The high temperature part of the heat exchanger can be insulated with ceramic foam to prevent damage to the other components mounted in the assembly. The other components include the combustion blower, the circulation pump, fuel pressure control valve, the fuel isolation valve, the electric solenoids and all of the sensor equipment. This is mounted in a sheet metal enclosure 62 that is sealed. Attachments include fuel connection 64, instrument penetration 66, coolant inlet 68, coolant outlet 70, air inlet strainer 20, and the hot gas exhaust point 44. Some blower air can be bypassed to cool the exhaust gas. Coolant 32 and 34 can be routed with hoses (including the strainer) to and from the engine assembly 36. The connections will depend on the engine design and can vary. The sensor and electrical leads 72 are bundled in a cable that routes to the operator space or a safe location for the electronics. The fuel vessel is fitted with excess flow protection.

The unit size can be established by the engine size. Fluid connections are made for circulator suction and circulator discharge. Hosing should be mounted and protected. This may vary due to differences in engine design.

Control conductors 72 can be routed from module 10 to the operator area. The cable 72 should be secured and protected from damage. This is a cable of thermocouples, control wires, and the like. Power can be provided from the vehicle system with switching, filtering and fusing. A thorough installation manual is required and may require a skilled mechanical technician to install. Most users would be industrial engine owners/operators and truck owners. The module is mounted in any convenient area external to the engine system. If the circulator is self-priming, the unit position is very flexible. If the circulator is centrifugal, then a flooded suction is needed. Comprehensive documentation can be provided for error codes and troubleshooting.

A primary focus of the heating module is to enable cold weather diesel operation. It could be modified to preheat gas fired engines as well. The resulting unit would be much smaller and would necessarily include added safety equipment to maintain proper safety because gasoline hazards are greater than diesel and because of the module location, venting is needed and fuel containers require added safety.

It should be understood, of course, that the foregoing relates to exemplary embodiments of the invention and that modifications may be made without departing from the spirit and scope of the invention as set forth in the following claims.

What is claimed is:

1. A portable engine preheater system comprising:

at least one propane fuel burner adapted to receive propane fuel from at least one location;

an air blower delivering air to the propane fuel burner;

a horizontal heat exchanger adapted to transfer heat from hot gas from the propane fuel burner to a coolant flow from an engine, wherein the coolant flows through a first flow path and a second flow path formed from coils mounted in a horizontal annular chamber, the first flow path being offset from the second flow path to create a turbulent flow of combustion gases thereover, the horizontal annular chamber having a continuous and unbroken inner and outer wall through which forced air travels.

2. The portable engine preheater system of claim 1, further comprising an isolation valve and solenoid valve for controlling the flow of propane fuel to the propane fuel burner.

3. The portable engine preheater system of claim 2, further comprising a pressure regulation valve controlling a pressure of propane fuel to the propane fuel burner.

4. The portable engine preheater system of claim 1, further comprising a flow detector to monitor flow of coolant from the engine.

5. The portable engine preheater system of claim 1, further comprising a flow meter to measure flow of air from the air blower.

6. The portable engine preheater system of claim 1, further comprising a microprocessor to control the flow of propane fuel to the propane fuel burner, activate the air blower and circulation pump based on inputs from one or more sensors.

7. The portable engine preheater system of claim 1, wherein the one or more sensors include flow meters, thermistors, thermocouples and flame detectors.

8. The portable engine preheater system of claim 1, further comprising a bypass air stream to cool exhaust flow from the heat exchanger.

9. A method for maintaining or preheating coolant of an engine to a warm condition, the method comprising:

flowing coolant from the engine through a horizontal heat exchanger, wherein the coolant flows through a first flow path and a second flow path formed from coils mounted in a horizontal annular chamber, the first flow path being offset from the second flow path to create a turbulent flow of combustion gases thereover, the horizontal annular chamber having a continuous and unbroken inner and outer wall through which forced air travels;

receiving hot gas into the heat exchanger from at least one propane fuel burner disposed in at least one location, the hot gas transferring heat to the coolant in the coils of the heat exchanger;

returning heated coolant to the engine; and regulating total process through a microprocessor, the microprocessor adapted to receive data from one or more sensors.

10. The method of claim 9, wherein the one or more sensors include flow sensors, flow detectors, thermistors, thermocouples and flame detectors.

11. A portable engine preheater system comprising:

at least one propane fuel burner adapted to receive propane fuel from at least one location;

an air blower delivering air to the propane fuel burner;

a horizontal heat exchanger adapted to transfer heat from hot gas from the propane fuel burner to a coolant flow from an engine, the horizontal heat exchanger having a horizontal annular chamber having a continuous and unbroken inner and outer wall through which forced air travels.

12. The portable engine preheater system of claim 11, further comprising an isolation valve and solenoid valve for controlling the flow of propane fuel to the propane fuel burner.

13. The portable engine preheater system of claim 12, further comprising a pressure regulation valve controlling a pressure of propane fuel to the propane fuel burner.

14. The portable engine preheater system of claim 11, further comprising a flow detector to monitor flow of coolant from the engine.

15. The portable engine preheater system of claim 11, further comprising a flow meter to measure flow of air from the air blower.

16. The portable engine preheater system of claim 11, further comprising a microprocessor to control the flow of propane fuel to the propane fuel burner, active the air blower and circulation pump based on inputs from one or more sensors.

17. The portable engine preheater system of claim 11, wherein the one or more sensors include flow meters, thermistors, thermocouples and flame detectors.

18. The portable engine preheater system of claim 11, further comprising a bypass air stream to cool exhaust flow from the heat exchanger.

* * * * *